Figure 1A:
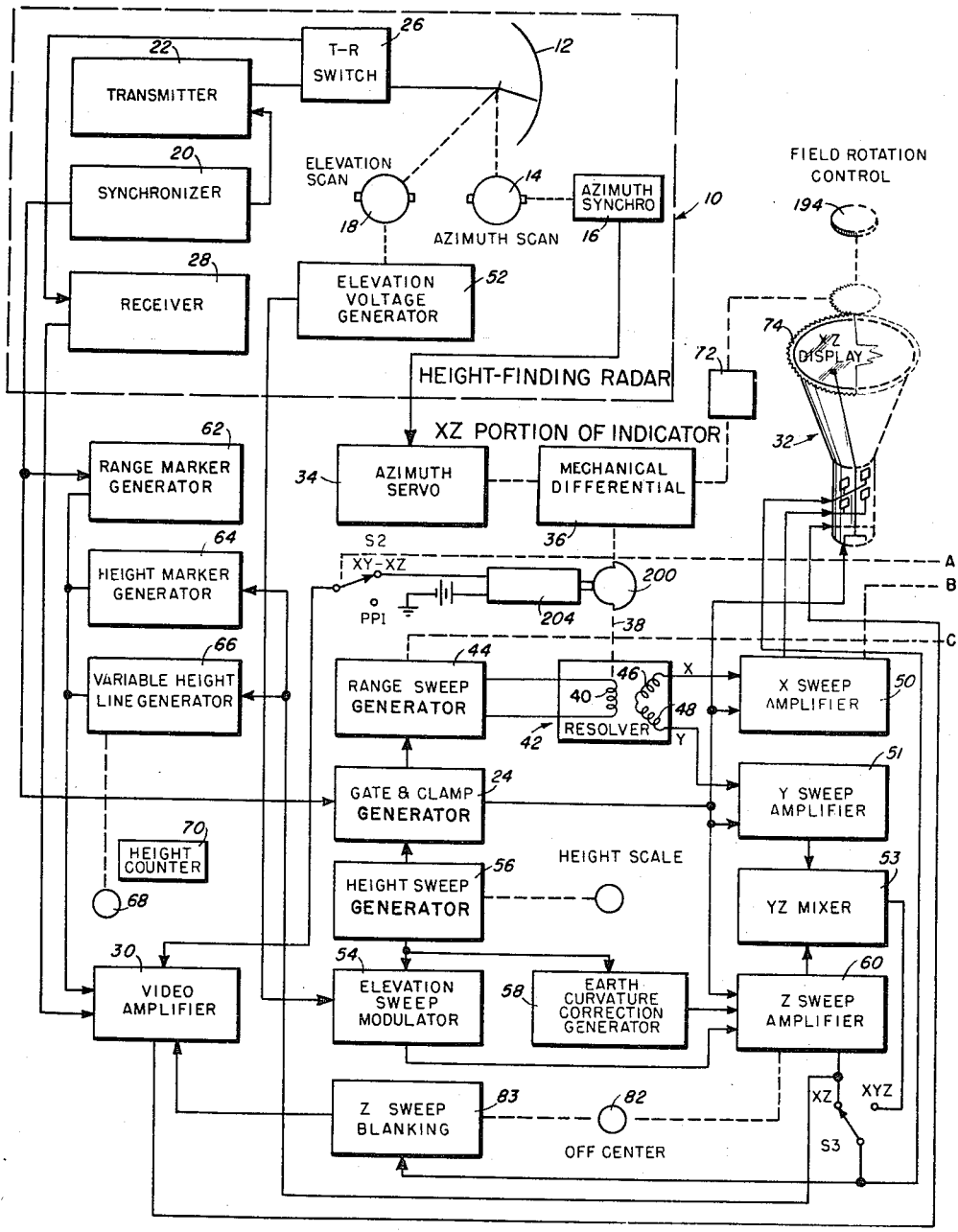

Aug. 30, 1960 J. DONAHUE 2,951,244
THREE COORDINATE ORTHOGRAPHIC DISPLAY SYSTEM
Filed Oct. 20, 1955 5 Sheets-Sheet 2

INVENTOR.
JOHN DONAHUE
BY George Sipkin
George E. Pearson
ATTORNEYS

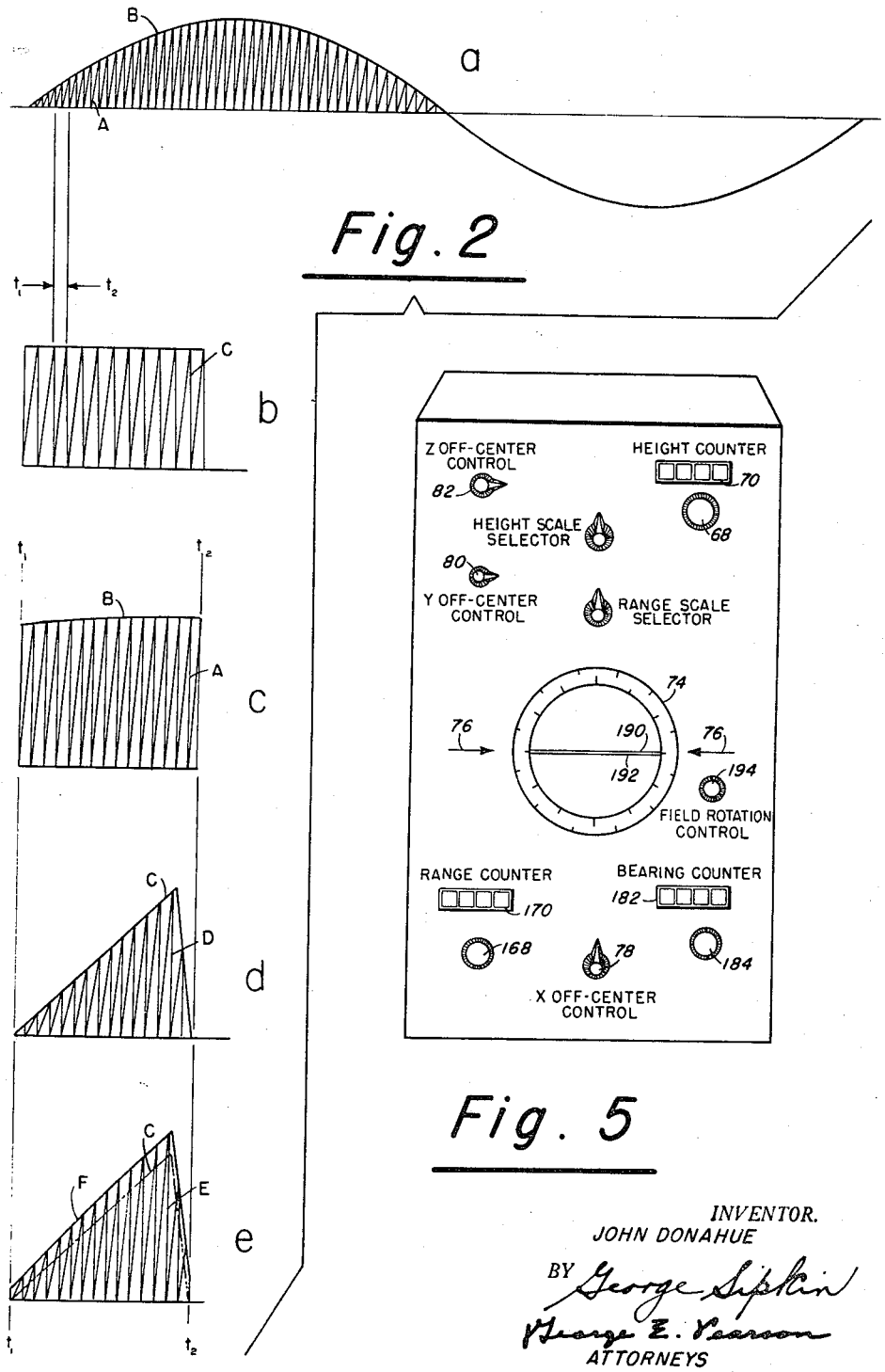

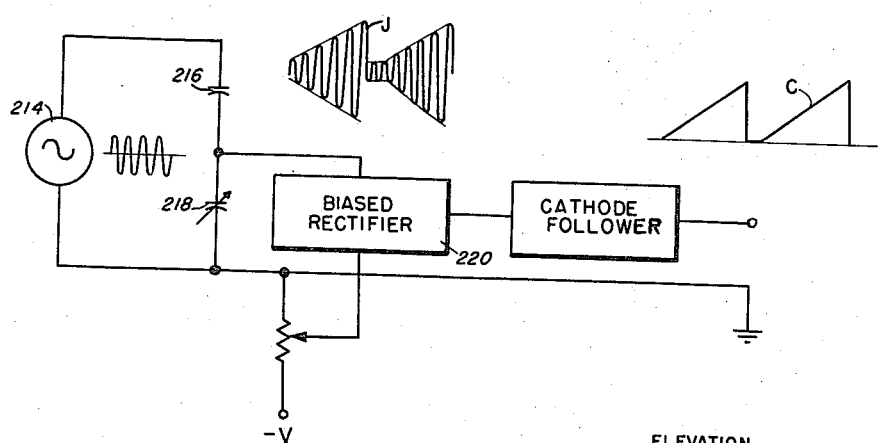
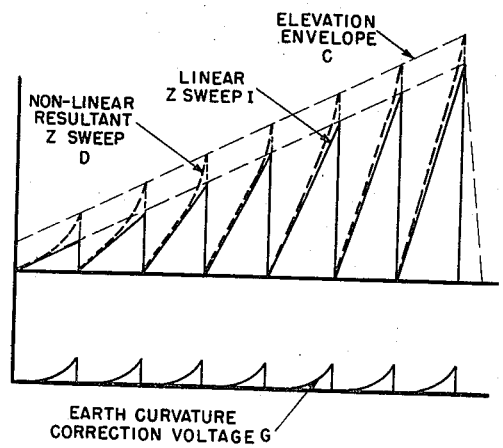
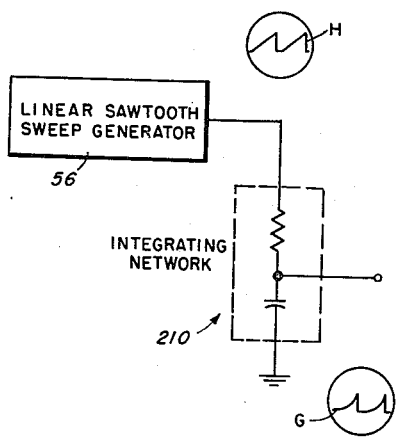
Fig. 4
Fig. 3b
Fig. 3a
INVENTOR.
JOHN DONAHUE

Aug. 30, 1960 J. DONAHUE 2,951,244
THREE COORDINATE ORTHOGRAPHIC DISPLAY SYSTEM
Filed Oct. 20, 1955 5 Sheets-Sheet 5

INVENTOR.
JOHN DONAHUE
BY George Sipkin
George E. Pearson
ATTORNEYS

United States Patent Office 2,951,244
Patented Aug. 30, 1960

2,951,244

THREE COORDINATE ORTHOGRAPHIC DISPLAY SYSTEM

John Donahue, 1224 Catalina Blvd., San Diego 7, Calif.

Filed Oct. 20, 1955, Ser. No. 541,868

15 Claims. (Cl. 343—11)

(Granted under Title 35, U.S. Code (1952), sec. 266)

The invention described herein may be manufactured and used by or for the Government of the United States of America for governmental purposes without the payment of any royalties thereon or therefor.

This invention relates to a three coordinate display system and more particularly to a system for the three coordinate display of spatial target information by means of a pair of orthographic projections on a single cathode ray tube screen.

Many attempts have been made to portray information obtained by radar scanning in three dimensions. Most of these systems portray two dimensions in a conventional manner in a plan position indicator, usually the two dimensions in a horizontal plane which may be read out and displayed as range and bearing or as X and Y rectangular coordinates. The third dimension is usually portrayed by a form of coding which may be size, color, the length of a radial line extending toward the target, or a vertical strobe through the target. Read out of the third dimensional information is usually approximate or at best very inaccurate and oftentimes confuses or completely obliterates the information which would normally be obtained from the plan position indicator. Sometimes another tube is used displaying range plotted against height. Another system utilizes the plan position indicator showing bearing and range on an inner circle and the height shown on an outer annulus, where the radial distance from the outer edge of the inner circle indicates the height of the target. The two displays are correlated by means of target bearing, and, where two targets lie on the same bearing, it is impossible to determine the height of each individual target. None of these systems portray the three dimensional information in a form which presents a clear visual concept of the spatial arrangement of the objects such as land, air or sea targets with respect to own ship or adjacent land masses and configurations. Various forms of synthesized stereoscopic pictures have also been utilized for displaying three dimensional information utilizing polarized light or two color pictures with two images suitably offset and diminished to give a pictorial effect of three dimensions in space.

Although many methods for three dimensional and three coordinate displays have been utilized or proposed, all of these methods have serious limitations in one or more respects. Many of these methods are not adequate in a quantitative sense, since the pictures displayed are not accurate in all three dimensions, and others which portray accurately all dimensions are not adequate qualitatively for interpretation by the operator, since they are presented in a manner which makes it difficult to conceive the spatial configuration of the targets. Under certain conditions with multiple targets, the presentations of the previous methods result in overlapping, clutter, confusion, or ambiguity with respect to the actual location of the targets and no means is known for resolving these ambiguities. Another serious inadequacy of the previous methods is the lack of system adaptability with respect to the coordinate input which is acceptable to the systems, flexibility of function and the different electronic systems with which the display may be utilized. The information which may be fed into a display system might consist of cylindrical, spherical, or rectangular coordinates, and in most of the previous methods only two of these three systems of coordinates are acceptable. In many of the prior systems the information could not be plotted at all or could not be plotted meaningfully, and it was impossible to read position coordinates quickly and with accuracy. Many of the prior visual display systems are useful with only one electronics system and can only be utilized with difficulty, if at all, with the other electronics systems, such as radar, simulators, and sonar. Many of the refinements which can be utilized in connection with some visual displays are not universally usable with all such displays. Earth curvature corrections, expandable scale, off-centering, and plotting directly on the scope with a conductive glass overlay for accurate read out cannot be utilized with many of the previous systems. Each of the prior art systems or methods of display in three coordinates or three dimensions is deficient in certain respects.

In the co-pending application of Coburn et al., Serial No. 383,414, filed September 30, 1953, for "XY—XZ Display System," there is disclosed a system which substantially eliminates many of the deficiencies of prior three dimensional display systems. This system of Coburn et al. comprises circuitry for resolving raw radar data and applying it to the deflection coils and grids of two cathode ray tubes to produce an elevation view in one tube and a plan view in the other tube, representing the target or targets accurately in the X and Z coordinates and in the X and Y coordinates respectively. The actual physical relation between the two displays of this system is the basis of a large portion of the improved results obtained. However, the use of two separate tubes necessarily limits the proximity of the two displays. Furthermore, the system of Coburn et al. fails to make adequate provision for continuous sector selection.

The U.S. patents to Tasker, No. 2,663,868, and Tasker et al., No. 2,649,581, disclose the broad concept of presenting elevation and plan displays on a single screen but these patented systems provide coverage of a relatively small azimuth sector only and must utilize an antenna system developed specifically for the disclosed display. The time sharing of the single cathode ray beam of the Tasker patents eliminates the possibility of using such a system for presentation of information derived from a pair of conventional independent antenna systems.

The present invention presents a pair of physically correlated 180° views, in plan and elevation respectively, on a single screen whereby the physical separation between the related orthogonal views of the radar targets is reduced to a minimum. The two views are produced by a pair of electron guns (and associated beam-forming and beam deflection electrodes) mounted in a single envelope. Each gun is independently controlled to provide the desired electron-beam sweep across the face of the entire screen and a portion of each sweep is blanked to avoid overlapping or interference between the two views. Thus, the two guns may produce a correlated, combined plan and elevation display of information derived, respectively, from independent and unsynchronized search and height finding antenna systems for a selected 180° azimuth sector. Provision is made for shifting the 180° azimuth coverage sector of each gun uniformly throughout all points in azimuth. While either electron gun may be used alone to present a single two-coordinate plan or elevation display having a full 360° view in azimuth coverage for general all-around surveillance, the combined mode of presentation furnishes complete three-coordinate information on targets of special interest located in a selected azimuth sector. In important applications of the proposed display system such as Air Control and Air Defense, it is common practice to assign a limited azimuth sector coverage to each of a number of operators or controllers at separate display scopes, thereby distributing the workload and permitting more concentrated attention to be given to each assigned sector. Full azimuth coverage could be obtained by use of two of the display systems of this invention.

It is an object of this invention to provide an improved system and display for presenting three-coordinate target information in correlated plan and elevation views.

Another object of this invention is the provision of a display system for presenting a pair of views of information derived from non-synchronized sources wherein the physical separation between the two views is reduced to a minimum.

A further object of this invention is the provision of means for controlling the azimuth orientation of a radar cathode ray tube display.

Still another object of this invention is to provide a display system for presenting on a single CRT screen information derived from search and height-finding radar systems which may be synchronized or completely independent.

Figure 1B:
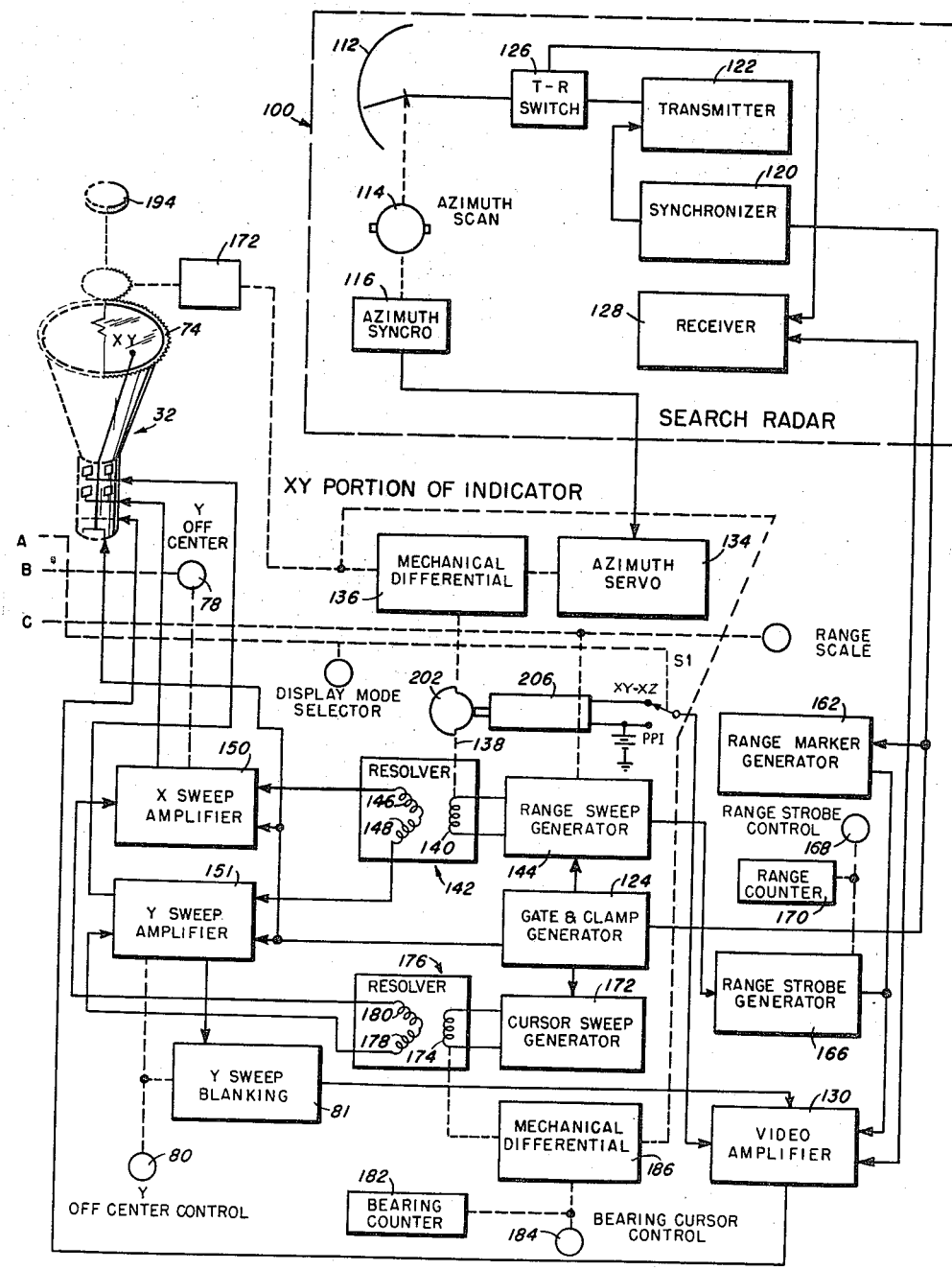

Other objects and many of the attendant advantages of this invention will be readily appreciated as the same becomes better understood by reference to the following detailed description when considered in connection with the accompanying drawings wherein:

Figs. 1a–1b together comprise a block diagram of one form of the invention as applied to a radar system embodying independent antennae;

Fig. 2 illustrates the deflection voltage wave forms fed to the deflection controls of the XZ electron gun;

Figs. 3a and 3b schematically depict the earth curvature correction circuitry and associated waveforms;

Fig. 4 schematically depicts one form of elevation angle voltage generator;

Fig. 5 depicts the control console in which the indicator portion of the invention is mounted; and Figs. 6a–6e are a series of views of the images presented on the upper and lower halves of the tube to show the development of a plurality of targets and land masses in a selected 180° azimuth sector.

In Figs 1a, 1b is shown in block diagram form a simplified embodiment of the invention in conjunction with a radar system embodying two antennae, an elevation or height finding antenna and a search or azimuth antenna.

The height finding radar 10 shown enclosed within the dotted rectangle in Fig. 1a comprises an elevation antenna 12 which is rotated about a vertical axis at a relatively slow speed of from 1 to 40 revolutions per minute by an azimuth scan motor 14 mechanically coupled with the azimuth synchro 16 which converts antenna (or motor) shaft position into electrical signals. The energy beam of antenna 12 is caused to nod or oscillate about a horizontal axis at a much more rapid rate such as 10–20 cycles per second by the elevation scan motor 18 which effects electronic control of the antenna feed as is well known, through an elevation sector which may be, for example, 0°–11°. The synchronizer or timer 20 transmits a synchronizing signal, which may be, for example, 1170 pulses per second, to the transmitter 22 and to the gate and clamp generator 24 shown in the X—Z indicator portion of the equipment. The transmitter feeds the antenna at the synchronized pulse repetition rate through the T—R box 26 from which received target echoes are fed to the receiver 28 and thence to the video amplifier 30. The video amplifier, in response to target echoes, intensity modulates the ray emitted by one emitter or electron gun of the dual gun, single envelope cathode ray tube 32. The tube 32 includes two separate electron emitters or guns each of which has its own focusing, accelerating, intensity and deflection controls. Electrostatic deflection controls are required in order to conveniently achieve independent deflection of the two electron beams without interaction. It will be understood that for purposes of illustration one half of tube 32 providing the XZ display and having one of the two electron guns is shown in Fig. 1a whereas the other half of the tube providing the XY display and having the other gun is shown in Fig. 1b. Any conventional two gun tube suitable for this purpose may be employed such, for example, as the Dual Beam Electrostatic Deflection and Focus Cathode Ray Tube, type 5SP7, manufactured by Allen B. Dumont Laboratories, Inc., and disclosed in "A Catalog of Equipment for Oscillography," 8th ed., March 1951.

Referring now to the horizontal or X component of the X—Z display portion of the tube 32 (Fig. 1a and Fig. 2), the azimuth servo 34 in response to shaft or azimuth position signals from synchro 16 physically rotates through mechanical differential 36 the shaft 38 on which is mounted rotating coil 40 of resolver 42. Coil 40 is fed with a sawtooth voltage at pulse repetition rate from range sweep generator 44 which is controlled by the gate and clamp generator 24. Resolver 42 includes a pair of stator coils 46, 48 which are physically arranged in quadrature whereby the voltage fed from coil 46 to the X sweep amplifier 50 and thence to the horizontal deflection plates of the XZ gun will comprise a sawtooth A at pulse repetition rate (1170 pulses per second) amplitude modulated by a sine wave B (in accordance with the coupling angle between coils 40, 46) having a frequency of from 1 to 40 cycles per minute (0.167 to 0.667 cycles per second) as shown in Fig. 2.

Referring now to the vertical or Z component of the XZ display portion of tube 32, there is generated by the elevation angle voltage generator 52 (described in connection with Fig. 4) an elevation sweep modulating voltage C (Fig. 2), a D.-C. voltage having an amplitude directly proportional to the elevation angle of the antenna beam, which is caused to amplitude modulate in elevation sweep modulator 54 a sawtooth voltage D at pulse repetition rate. Modulating the sweep sawtooth D by the elevation scan voltage is equivalent to forming the product of these two quantities, thus obtaining a resultant wave form (the Z sweep) in accordance with the relation $Z = R \sin \phi$ (where $\phi$ is elevation angle and R is range). Because for small angles the sine is practically equal to the angle itself (expressed in radians), $Z = R\phi$, where $\phi$ does not exceed 11°. Sawtooth D is generated by height sweep generator 56 under control of gate generator 24 and is modified by the earth curvature correction generator 58 (described in connection with Fig. 3) after being modulated by elevation angle voltage C. Separate sweep generators 44 and 56 are used to permit independent selection of range and height scales. As explained below and shown in Fig. 3b the otherwise linear sawtooth D is caused to curve upwardly by the earth curvature correction but is shown as linear in Fig. 2 for convenience of illustration. For the XZ display the sawtooth D, amplitude modulated by sawtooth C at nodding or elevation scan frequency is fed without further modification to the vertical deflection plates of the XZ gun through Z sweep amplifier 60. The X and Z deflection voltages are shown in Figs. 2a and 2b, the latter showing only the envelope C because of scale limitations. Figs. 2c and 2d show to an enlarged scale the deflection voltages existing during time $t_1$—$t_2$, one complete elevation cycle, and clearly illustrate the synchronized sawtooth sweep voltages A and D. It is to be noted that, during one complete elevation scan the azimuth envelope B remains substantially unchanged due to the great variance between azimuth and elevation scan frequency. Thus there is effected something on the order of one hundred radial sweeps of the cathode-ray electron beam, of progressively increasing slope, while the peaks of the X sweep and the azimuth position of the antenna remain substantially constant during this time interval.

As is well known, fixed range and height markers and variable height lines may be produced on the display by intensity modulating the cathode ray with signals produced by range marker generator 62, height marker generator 64 and variable height line generator 66. A control knob 68 and counter 70 are provided for respectively adjusting and indicating the position of the movable height line. The range marker is a train of time-controlled pulses synchronized from synchronizer 20. Height generators 64 and 66 compare the Z sweep voltage from Z sweep amplifier 60 with a fixed and manually variable D.-C. potential, respectively, to produce a height marking pulse each time the Z sweep voltage exceeds selected amplitude thresholds.

Earth curvature correction of the target height data is made in the XZ display, so that the height information referred to a curved datum plane may be presented in relation to a flat datum plane. The obvious advantage in employing this transformation is that the resulting earth-curvature-corrected height data presented on a two-dimensional XZ display can be directly interpreted without taking into account the target azimuth in relation to the selected projection plane. To accomplish this, a time-varying earth-curvature correction voltage having an amplitude proportional to the square of the instantaneous radar range is added to the linear Z sweep voltage, the latter having been produced by modulating the linear height sweep voltage by the elevation angle voltage. The resulting composite waveform is the earth-curvature corrected Z sweep which, in combination with the linear X-axis sweep A (Fig. 2a), produces upwardly curving sweep traces on the XZ display instead of the conventional straight-line traces. Target indications are automatically given the correct Z-axis displacement relative to the X-axis of the display. Surfaces of constant height above a curved earth appear as straight horizontal lines on the display.

The correction to be added to indicated target height above a horizontal plane is, to a first order approximation, $Q = r^2/2$ where Q is the correction expressed in feet and r is range expressed in miles. Therefore if a time varying waveform representing Q can be generated, it can be added to a linear Z sweep sawtooth (representing height over a flat earth) to obtain a resultant sweep which has the correct waveform and slope to represent instantaneous height over a curved earth. As shown in Figs. 3a and 3b, the required square law correction voltage G is obtained by integrating in integrating network 210 the linear sawtooth output H of generator 56. Voltage H is modulated by the elevation voltage C to produce the linear Z sweep I. Adding waveform G to I furnishes a resultant non-linear Z sweep which has the proper curvature to compensate for earth curvature.

The elevation angle generator 52 may be simply a linear potentiometer mechanically coupled with elevation scan motor to develop a linear sawtooth (such as C in Fig. 2) having an amplitude directly proportional to the elevation of the antenna beam. However, because of the excessive wear on the brush of such potentiometer a variable capacitor type of elevation angle voltage generator (Fig. 4) is preferred. A high frequency (on the order of 2MC) A.-C. voltage is generated by oscillator 214 across a capacitive voltage divider comprising fixed capacitor 216 and variable capacitor 218, the latter being linked mechanically to the elevation scan motor 18. The voltage J across capacitor 218, and A.-C. wave amplitude modulated at the antenna nodding frequency is rectified and filtered in biased rectifier 220 from which it is taken via a cathode follower as the modulating voltage C. Since capacitor 218 would have to be infinite in order to produce a zero voltage drop, an adjustable negative bias from source-V is provided for rectifier 220 whereby the minimum amplitude portion of voltage J is eliminated and voltage C will drop to zero when the antenna elevation is zero. The "dead" time shown in Fig. 4 between successive cycles of voltage C is a result of structural characteristics of capacitor 218 and is omitted from Fig. 2 for convenience of illustration.

The search radar 100 shown enclosed within the dotted rectangle in Fig. 1b comprises an azimuth antenna 112 which is rotated about a vertical axis at a relatively slow speed of from 1 to 40 revolutions per minute by an azimuth scan motor 114 mechanically coupled with synchro 116. It is to be noted that neither synchronism of speed nor phase of the azimuth scan of the two antennas is required. The synchronizer or timer 120 transmits a synchronizing signal, which may be for example 390 pulses per second, to transmitter 122 and gate and clamp generator 124 shown in the XY indicator portion of the equipment. The transmitter 122, receiver 128, T-R box 126, video amplifier 130, range sweep generator 144, azimuth synchro 116, azimuth servo 134, differential 136, shaft 138, resolver 142 and X sweep amplifier 150 are all structurally and functionally similar to corresponding components of the XZ portion of the indicator except for the pulse repetition rate and azimuth scanning speed and these XY components are coupled with the controls of the second of the two electron guns of tube 32. Thus there is fed to the horizontal or X deflection plates of the XY gun an amplitude modulated sawtooth similar to curves A, B of Fig. 2a, except for sawtooth repetition rate and frequency of modulation envelope. It is to be noted that the X component of the sawtooth sweep fed to the horizontal deflection plates of each electron gun must have identical slopes in order to obtain vertical alignment of the same target in each half of the display. In other words the same range scales are used for each gun and a single range scale selector is provided for the two range sweep generators. The voltage fed to the vertical or Y deflection plates of the XY gun from Y sweep amplifier 151 and resolver coil 148 is identical with that fed to the X deflection plates but is phase shifted 90° by virtue of the quadrature relation of resolver coils 146, 148. Thus a conventional P.P.I. (plan position indicator) sweep is produced wherein the beam trace repeatedly sweeps radially from the scope center and consecutive radial sweeps are increasingly displaced angularly in accordance with the azimuth scan of the antenna beam.

As is well known, a range marker generator 162 controlled by timer 120 feeds through video amplifier 130 to intensity modulate the cathode ray to produce fixed range circles (or semi-circles). Range strobe generator 166 functions in a manner similar to height line generator 66 to compare with a sawtooth from range sweep generator 144 a variable D.-C. voltage controlled by knob 168 and indicated by counter 170 whereby a movable intensity modulating range strobe may be fed to tube 32 through video amplifier 130. Suitable gates and clamps are applied to the several sweep generators, sweep amplifiers and both guns of tube 32.

Cursor sweep generator 172, controlled by gate generator 124, feeds to the movable coil 174 of resolver 176 a sawtooth which is time shared with the output of range sweep generator 144. As in the other resolvers the fixed coils 180, 178 of resolver 176 which are physically arranged in quadrature feed to the XY deflection plates through respective sweep amplifiers 150, 151, a pair of sawtooth deflection voltages of amplitudes respectively controlled by the angular relation between coils 180, 174 and between coils 178, 174 whereby there is produced an intensified radial trace having a bearing in accordance with the angular position of coil 174. The position of coil 174 (and thus the bearing of the cursor) is indicated by counter 182 and controlled by knob 184 through mechanical differential 186.

The XZ display produced on the screen of tube 32 will always be at or above a fixed horizontal base line 190 (Fig. 5) although it will sweep back upon itself during each 180° of azimuth cycle in the absence of the gating described below. In the absence of any gating, the XY display would be a full 360° P.P.I. type scan covering substantially the entire screen area. In order to avoid interference between the two displays, the XY display is limited to a particular screen portion, that half below fixed base line 192. This is accomplished by diminishing the amplification provided by the video amplifier 130. Conveniently the XZ portion of the display is similarly blanked or diminished in intensity during that azimuth sector in which the XY display is eliminated whereby a correlated pair of views is always displayed. In the preferred form, the picture limiting is effected by cut off of the video amplifier tubes to blank the video. The blanking of the video is conveniently effected by 180° azimuth gating cams 200, 202 fixedly mounted on shafts 38, 138 which actuate switches 204, 206 to connect the video amplifier tubes with a positive enabling voltage source. Of course, if desired, a negative blanking voltage could be supplied instead. The cams are arranged on the shaft so that blanking is always provided (in XY for example) when coil 140 is in position to direct the ray of the XY gun within the upper half or XZ portion of the screen. The phase or relation between the angular positions of coils 40, 140 and the azimuth position or bearing of the respective antennae is adjustably controlled by field rotation control 194 which is mechanically connected by suitable linkage or gearing 72, 172 to one input of differentials 36, 136, the second input of each differential being derived from the azimuth servos. Thus rotation of control 194 appropriately modifies the antenna bearing data which is fed via shafts 38, 138 to position rotor coils 40, 140. Mounted for rotation about an axis perpendicular to the plane of the display screen and concentric therewith is a bearing ring 74 suitably geared to control 194 and having bearing indicia which together with fixed index marks 76 (Fig. 5) provide a most convenient indication of the angular limits of the selected azimuth sector. For example, the position illustrated in Fig. 5 signifies that the information presented in the XY and XZ displays is that obtained from radar examination of the space hemisphere encompassing the bearing sector whose limits are defined by azimuth indicia immediately adjacent marks 76, respectively. The bearing sector indication is preferably correlated with the XY portion of the display. Actually the bearing sector indication could be either of two indicated 180° areas but the sector is always read through the lower half of ring 74 to avoid ambiguity. It should be noted that the line of demarcation, 190, 192, between the two displays is fixed. The targets shift relative to it when the projection plane of the XZ display and the azimuth sector of the XY display, both indicated by index marks 76, are rotated about the antennae position.

Since rotation of the displayed sector would introduce an error into the indication provided by bearing counter 182, the reading of the counter is corrected by the field rotation control position which is mechanically fed to differential 186 and adds to the position of rotor coil 174 an angular component in accordance with the position of control 194.

Figure 6:
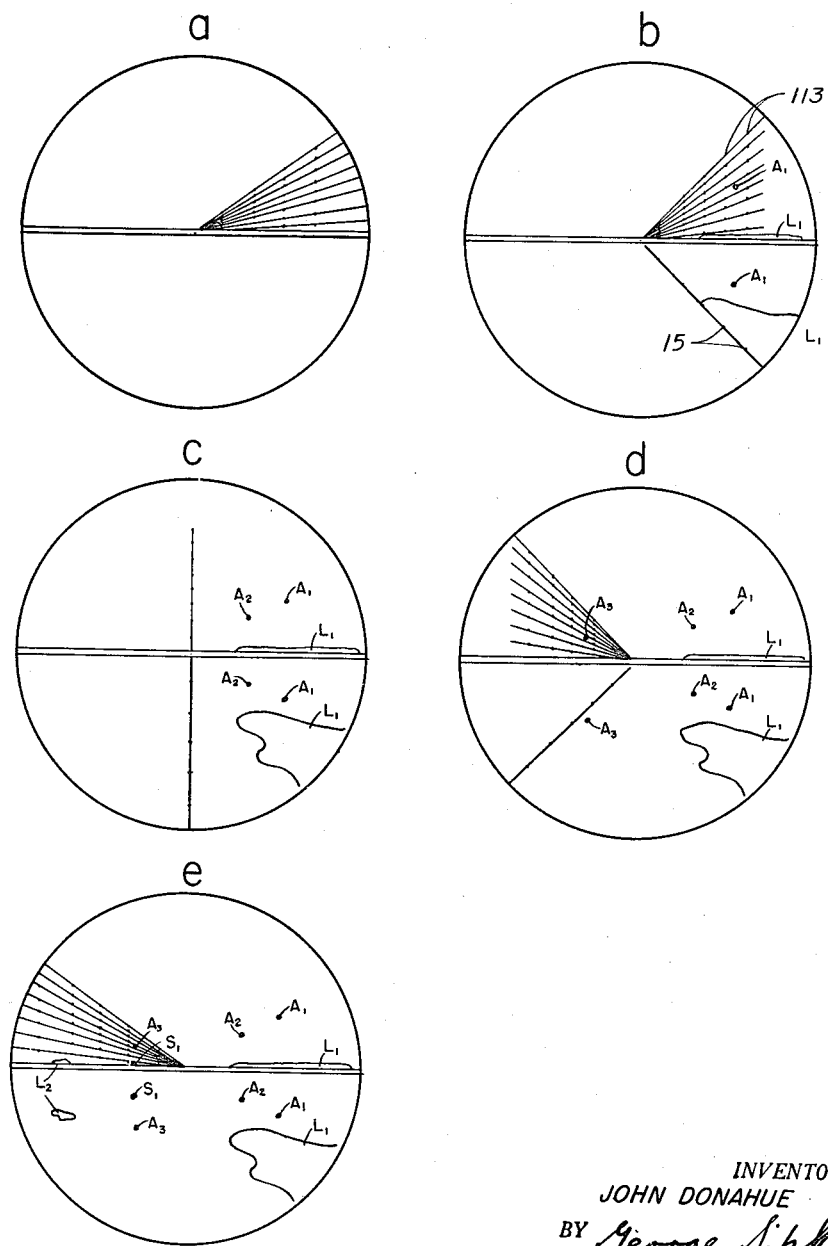

The pictures displayed by the upper and lower halves of the cathode ray tube are clearly illustrated in the series of Fig. 6 which shows the development of a plurality of air and sea targets and land masses over a selected 180° sector taken at 45° intervals. The actual picture displayed on the tube will appear as light lines and areas formed by activation of the phosphorescent coating by the electron beam on the dark face of the tube, but is shown as dark lines and shaded areas on a white background for clarity in the drawings.

It will be apparent that, during a single complete elevation cycle, a complete triangular area will be scanned by a plurality of radial lines on the XZ display while a single line is being scanned repeatedly on the XY display as illustrated in Fig. 6. While only nine lines have been shown covering the triangular area on the XZ display for the sake of clarity, it will be understood that this area will be covered in actual use by a large number of lines corresponding to the number of discrete signals transmitted during each period of oscillation of the elevation antenna, and each line will have a plurality of intensified spots such as those indicated at 113 at equal intervals produced by the range marker which correspond to the range marking spots 15 on the lines of the XY display. Actually the plurality of spots at each interval of horizontal range will blend into a number of vertical lines.

Fig. 6b illustrates the development of an air target A1 and a land mass L1 after 45° rotation of the sweep, the sweep being shown during 1 cycle of the elevation antenna and the targets remaining on the screen due to persistence of the intensified spots and areas caused by the video signal.

The picture is shown in Fig. 6c with the sweep at 90° from that shown in Fig. 6a, and in this position it is possible to have some ambiguity with two targets directly in line and at different ranges and elevations. However, this ambiguity is resolved at once by rotation of the target field from the position shown. Gradual rotation of the target field permits the viewer to see any sectional elevation view which he desires.

Additional air targets A2 and A3 are shown developed in Figs. 6c and 6d, where the sweep has progressed through an additional 45° angle in each view. In Fig. 6e the sweep of the 180° sector has been completed with the additional development of a sea target, such as a ship S1, and an additional land target or island L2.

Some ambiguity also exists with respect to the targets A3 and S1 which might be resolved by a close observation of the timing as the sweep progresses, but if desired, this ambiguity could also be readily resolved by rotation of the field in either direction.

The present arrangement permits the resolution of certain ambiguities by timing with a large degree of facility, since the correlation between the scopes is relatively easy by reason of the vertical alignment which could, if desired, be facilitated by vertical lines extending across the display. However, the range markers serve substantially the same purpose and in most cases will provide sufficient correlation between the targets on the displays in the upper half and the lower half which correspond to an elevation and plan view of conventional drafting techniques.

While the visual effect is difficult to portray in a series of drawings, the correlation of targets is materially assisted by watching the sweep on both tubes simultaneously with the same target showing on both the upper and lower halves simultaneously and in direct vertical alignment which facilitates the qualitative interpretation of the picture as the sweep progresses.

If desired, the observation may be limited to a particular area on a larger scale by range expansion and range and sector gating, but still maintaining the correlation and vertical alignment of targets to present a pictorial representation which is readily accepted and interpreted by the operator.

It will be apparent that all three dimensions are presented accurately to scale in the two views, the height being obtained accurately from the elevation view, and the range and bearing, or if desired the X and Y coordinates, obtained from the plan view on the lower half.

With the screen area coverage shown in Fig. 6 elevation information of high targets on the limits of the chosen azimuth sector may be missing but can be readily obtained by rotation of the target field. Alternatively the screen area of both displays may be limited (by decreasing the diameter of the XY range limit semi-circle) so that all portions of the XZ display will fall on the screen.

It will be seen that the XZ display is similar to the well known RHI (range height indicator) type of display which presents successive views of vertical sections of the target area taken in consecutively shifting azimuth planes and projected perpendicular to each of such azimuth planes. The XZ differs, however, in presenting successive elevation views as projections on a single selected fixed projection plane. Thus the XZ display presents successive oblique projections of varying obliquity wherein the projection angles are 90° only at the two limits of the selected 180° sector. The XZ display is, in effect, a rotating RHI type display on a fixed projection plane. This projection plane is rotated by operation of field rotation control 194 which simultaneously produces rotation of the target field on the XY display and an appropriate X-coordinate shift on the XZ display. Since indications of a particular target have the same X-coordinate of position on both displays (due to choice of the same range scale for each) the target blips on the XZ display will always appear directly above those corresponding to the same targets presented on the XY display. Shifting of the projection plane permits examination of the target situation in other 180° azimuth sectors and permits resolution of identification ambiguities which arise when two or more targets have the same X coordinate of position.

Because of the persistence of the screen both pictures can be painted on the scope in any time relation and physical correlation between the two is maintained as long as the range scales are the same.

The scope may be operated as a conventional PPI display with 360° azimuth coverage by moving mechanically coupled switches S1, S2 which operate respectively to bypass the azimuth cam 202 to continuously supply an enabling voltage to video amplifier 130 and maintain the enabling voltage continuously disconnected from video amplifier 30.

The XZ portion of the display may be operated as an XYZ display of the type disclosed in the co-pending application of L. G. Harris for "Three Dimensional Isometric Display System," Serial No. 385,900, filed October 13, 1953. This display is effected, as explained in detail in the Harris application, by adding to the Z deflection voltage an attenuated sawtooth sweep voltage which is amplitude modulated by a sine wave component of the antenna bearing which is in phase quadrature with the modulation envelope of the X deflection voltage. The voltage fed from stator coil 48 through Y sweep amplifier 51 to YZ mixer 53 is substantially identical with the voltage A, B shown in Figs. 2a, 2c but has an envelope which is phase shifted 90° relative to envelope B. Attenuated and mixed with voltage C, D (Figs. 2b, 2d) the voltage fed through switch S3 and mixer 53 to the vertical deflection plates of the XZ gun will have the wave form shown in Fig. 2e, a sawtooth E at pulse repetition rate amplitude modulated with envelope F. The latter has an instantaneous amplitude which is greater (or smaller) than envelope C produced by elevation angle generator 52 by an amount proportional to the Y component of the antenna bearing. Thus points of equal range on corresponding sweep traces of consecutive elevation scans will sweep an ellipse (or semi-ellipse on the XYZ display while such points would sweep a straight horizontal line on the XZ display. This elliptical display provides a realistic isometric view of the selected space hemisphere and may be arranged to provide full 360° coverage by disabling the XZ azimuth gating mechanism and the XY video.

Left or right off-centering of the presentation along the X-coordinate axis can be effected simultaneously on both upper and lower displays by control knob 78 which in effect adds a steady D.-C. voltage to the X sweep voltages to shift the horizontal coordinate of the point of origin of the sweep. Separate off center controls 80, 82 operate in the same manner as control 78 to respectively shift the vertical coordinates of the points of origin of the XY and XZ sweeps, upwardly only and downwardly only, respectively. Internally generated blanking signals of duration proportional to the Y-axis and Z axis off-centering voltage are produced by Y and Z sweep blanking generators 81, 83. Thus each off-centered display is blanked for that initial portion of its sweep when its trace would fall within the screen area assigned to the other display and interference is avoided. Provision may be made for independently or simultaneous setting all calibrated off-centering controls to obtain distortionless displacement of the target field by any amount up to a maximum of several radii. By proper combination of range and height scales (the latter controlled by an independent height scale selector), as is well known, in conjunction with the off centering controls, targets located anywhere within the radar coverage may be presented with enhanced detail on expanded displays.

A glass cover plate (not shown) overlying the scope may be rigidly attached to the bearing ring 74 so that a grease pencil plot of target positions, as depicted on the XY display, can be made in the usual manner. The grease pencil marks will remain in alignment with the target blips as the field is rotated. The XZ display is not directly adaptable for plotting on the scope face in this manner.

If the disclosed indicator system is to be used with synchronized and optimumly phased search and height finding antennae duplication of many of the components may obviously be avoided. For example, there would be required with such synchronized antennae but a single one of each of synchronizer 20, motor 14, synchro 16, servo 34, cam 200, and range marker generator 62 as indicated in the above mentioned applications of Harris and Coburn et al.

Obviously many modifications and variations of the present invention are possible in the light of the above teachings. It is therefore to be understood that within the scope of the appended claims the invention may be practiced otherwise than as specifically described.

What is claimed is:

1. An echo ranging and height finding system comprising an antenna adapted to cyclically scan in elevation with a projected energy wave, a cathode ray tube having a screen and a pair of beam deflection controls arranged in space quadrature, means for generating first and second linear sweep voltages, means for modulating said first sweep voltage in accordance with the antenna elevation angle to provide an amplitude modulated linear sweep voltage, means for generating an earth curvature correction voltage having an amplitude proportional to the time elapsed from the initiation of each sweep of said first sweep voltage, means for adding said correction voltage to said modulated sweep voltage to produce a non-linear sweep voltage, means for applying said last mentioned voltage to one of said controls, and means for applying said second sweep voltage to the other of said controls, whereby the position of the trace of the cathode ray beam relative to a straight reference line on said screen will indicate height of the projected energy wave relative to curved earth.

2. In a direction and ranging system, an antenna system adapted to scan in azimuth and elevation, cathode ray tube display means having a fluorescent screen and a pair of independent electron guns, a pair of deflection controls for each of said guns, sweep voltage generating means for each gun, means controlled by azimuth position of said antenna system for resolving and modulating the sweep voltage for one gun to produce a pair of X and Y component sweep voltages in accordance with X and Y components of said azimuth position, means for modulating the sweep voltage for one deflection control of the other of said guns to produce an X component sweep voltage in accordance with an X component of antenna azimuth position, means for modulating the sweep voltage for the other deflection control of said other gun in accordance with the elevation of said antenna system, and means for manually shifting the respective phase relations between said X component sweep voltages and antenna azimuth position.

3. The structure of claim 2 wherein said shifting means includes means for simultaneously and continuously shifting said phase relations.

4. The structure of claim 3 including means coupled with said shifting means for blanking the electron beam of each gun for an azimuth sector of predetermined angular width.

5. A display system comprising a pair of electron guns and fluorescent display means for producing a visual indication in response to electron beams received from said guns, first and second pairs of deflection controls for said first and second guns respectively, first and second sweep voltage generators, means for modulating the sweep voltage of each generator in accordance with a cyclically varying information signal, means for feeding said modulated sweep voltages to one deflection control of each pair respectively to move each electron beam in the direction of a first coordinate in the plane of said display means, means for energizing the other deflection control of each pair to effect movement of said beams in the direction of a second coordinate in the plane of said display means, and means for shifting the phase of the modulation envelope of at least one of said modulated sweep voltages relative to the phase of said information signal.

6. A display system comprising a cathode ray tube having an electron gun and a display screen, deflection controls for said gun, means for generating a sweep voltage, resolver means for feeding said voltage to said deflection controls, said resolver means including magnetically coupled coils, first and second data sources, and differential means responsive to combined data from both said sources for controlling the coupling between said coils.

7. The system of claim 6 including a sector selector control, a sector indicator coupled with said control and movably mounted adjacent said display screen, the data from said first source comprising a cyclically varying angular coordinate, the data from said second source comprising the position of said sector selector control.

8. The system of claim 7 including an intensity control for said gun, and gating means responsive to said combined data from said sources for actuating said intensity control to blank and unblank the electron beam of said gun in accordance with a sector selected by said sector control.

9. A display system comprising a cathode ray tube having an electron gun and a display screen, deflection and intensity controls for said gun, means for generating a sweep voltage, resolver means for feeding said voltage to said deflection controls, said resolver means including a pair of stator coils arranged in space quadrature and a rotor coil magnetically coupled therewith, gating means fixed to said rotor for actuating said intensity control to blank the electron beam of said gun during a predetermined sector of rotor movement, an antenna, means for continuously rotating said antenna in azimuth, a bearing indicator ring circumscribing said screen and mounted for rotation in a plane parallel to the plane of said screen, a rotatable field rotation control mechanically coupled with said ring, a mechanical differential having an output shaft coupled with said rotor and gating means, said differential having a pair of input shafts, and means for transmitting the angular position of said antenna and of said field rotation control to respective input shafts of said differential whereby said beam will produce radial traces of consecutively varying slope within a fixed sector of said screen and the relation between said screen sector and the antenna azimuth sector to which it corresponds will be controlled by said field rotation control and indicated by said bearing ring.

10. The system of claim 9 wherein said cathode ray tube includes a second electron gun having X and Z deflection controls, a second intensity control for said second gun, means for generating a second sweep voltage, stator and rotor coils coupling said second sweep generator means to said X deflection control, second gating means fixed to said last mentioned rotor for actuating said second intensity control to blank the beam of said second gun during a predetermined sector of movement of said last mentioned rotor, a second differential having an output shaft coupled with said last mentioned rotor and gating means, said second differential having a pair of input shafts, a second antenna adapted to scan continuously in azimuth and oscillatably in elevation, means for transmitting the azimuth position of said antenna and the angular position of said field rotation control to respective input shafts of said second differential, means for generating a third sweep voltage in synchronism with said second sweep voltage, means for modulating said third sweep voltage in accordance with the elevation of said second antenna scan, and means for feeding said modulated third sweep voltage to said Z deflection controls, said first and second gating means being fixed to respective rotors so as to limit the unblanked sweep of said electron beams to mutually exclusive areas of said screen.

11. The system of claim 9 including a bearing cursor sweep generator, a pair of cursor stator coils in space quadrature and a cursor rotor coil for coupling said cursor generator with said deflection controls, a rotatable cursor control, a cursor bearing indicator connected to said cursor control, and mechanical differential means for positioning said cursor rotor in accordance with the combined positions of said cursor control and said field rotation control.

12. A display system comprising a cathode ray tube having a single display screen and a pair of electron guns, deflection control elements for each gun for respectively determining, in response to voltage applications thereto, the respective positions of the cathode ray of each gun in a first direction in the plane of the screen, means for generating first and second sweep voltages, means for modulating said sweep voltages in accordance with a cyclically varying coordinate, gating means fixedly phased relative to said modulating means for controlling the intensity of both said rays at the frequency of the modulation envelope of respective sweep voltages, means for simultaneously varying the phase relation between said cyclically varying coordinate and the modulation envelope of each sweep voltage, and means for determining the positions of each ray in a second direction in the plane of said screen.

13. A display system comprising a cathode ray tube having a single screen and first and second ray emitters, a first pair of deflecting means arranged in quadrature for said first ray, a second pair of deflecting means arranged in quadrature for said second ray, first and second sweep voltage generating means, first sweep modulating means coupled with said first sweep generating means for developing a first pair of periodic amplitude modulated deflection voltages of predetermined modulation frequencies, means for applying said first pair of deflection voltages to said first pair of deflecting means, second sweep modulating means coupled with said second sweep generating means for developing a second pair of periodic amplitude modulated deflection voltages of predetermined modulation frequencies, means for applying said second pair of deflection voltages to said second pair of deflecting means, means coupled with at least one of said sweep modulating means for limiting the display produced by at least one of said rays to a predetermined portion of said screen, and means for selectively controlling the phase of said one modulating means and said display limiting means.

14. Apparatus of the class described comprising a cathode ray tube having a single screen and a pair of independent electron guns, a pair of deflecting means for each gun, the means of each pair being arranged in quadrature, means for obtaining sine and cosine component voltages in accordance with components of a first varying angular coordinate, means for applying both said voltages to one of said pairs of deflecting means, means for applying one of said component voltages to one deflecting means of the other of said pairs, means for energizing the other deflecting means of said other pair, and means for continuously and simultaneously shifting the phase of said one component voltage applied to both electron guns relative to the phase of said angular coordinate.

15. The apparatus of claim 14 including means coupled with said phase shifting means for limiting the trace of the ray of each gun to predetermined areas of said screen.

References Cited in the file of this patent

UNITED STATES PATENTS

| | | |
|---|---|---|
| 2,083,203 | Schlesinger | June 8, 1937 |
| 2,483,644 | Kelsey | Oct. 4, 1949 |
| 2,640,984 | Sherwin | June 2, 1953 |
| 2,649,581 | Tasker | Aug. 18, 1953 |
| 2,688,130 | Whitaker | Aug. 31, 1954 |